(12) United States Patent
Hagedorn

(10) Patent No.: US 12,049,989 B2
(45) Date of Patent: Jul. 30, 2024

(54) VEHICLE HEADLAMP HAVING HIGH/LOW BEAM LIGHT GUIDES WITH DIFFERENT WIDTH ENTRY SURFACES

(71) Applicant: Hella GmbH & Co. KGaA, Lippstadt (DE)

(72) Inventor: Susanne Hagedorn, Lippstadt (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 0 days.

(21) Appl. No.: 18/061,406

(22) Filed: Dec. 2, 2022

(65) Prior Publication Data

US 2023/0096707 A1 Mar. 30, 2023

Related U.S. Application Data

(63) Continuation of application No. PCT/EP2020/065272, filed on Jun. 3, 2020.

(51) Int. Cl.
| | |
|---|---|
| *F21S 41/24* | (2018.01) |
| *B60Q 1/14* | (2006.01) |
| *F21S 41/143* | (2018.01) |
| *F21S 41/153* | (2018.01) |
| *F21S 41/25* | (2018.01) |
| *F21S 41/663* | (2018.01) |
| *F21W 102/13* | (2018.01) |

(52) U.S. Cl.
CPC ............. *F21S 41/24* (2018.01); *B60Q 1/14* (2013.01); *F21S 41/143* (2018.01); *F21S 41/153* (2018.01); *F21S 41/25* (2018.01); *F21S 41/663* (2018.01); *F21W 2102/13* (2018.01)

(58) Field of Classification Search
CPC ........ F21S 41/24; F21S 41/153; F21S 41/151; F21S 41/141; F21S 41/663; F21S 41/143; B60Q 1/04; B60Q 1/16; F21W 2102/13
See application file for complete search history.

(56) References Cited

U.S. PATENT DOCUMENTS

| | | | | |
|---|---|---|---|---|
| 10,082,264 | B2 * | 9/2018 | Hossfeld | F21S 41/25 |
| 10,168,014 | B2 * | 1/2019 | Lee | F21S 41/25 |
| 10,228,108 | B2 * | 3/2019 | Courcier | F21S 41/24 |
| 10,663,134 | B2 * | 5/2020 | Gousset-Rousseau | F21S 41/322 |

(Continued)

FOREIGN PATENT DOCUMENTS

| | | |
|---|---|---|
| DE | 102016109132 A1 | 11/2017 |
| EP | 1903274 A1 | 3/2008 |

(Continued)

*Primary Examiner* — Ismael Negron
(74) *Attorney, Agent, or Firm* — Husch Blackwell LLP

(57) ABSTRACT

A headlamp includes a plurality of first light sources for projecting a high beam, a plurality of second light sources for projecting a low beam, a first light guide, and a second light guide. The first light guide has a plurality of light entry surfaces arranged side by side for receiving light emitted from the first light sources and a first light exit surface. The second light guide has a plurality of light entry surfaces arranged side by side for receiving light emitted from the second light sources and a second light exit surface. At least a first one of the light entry surfaces of either the first light guide or the second light guide has a greater width in the direction in which the light entry surfaces are arranged than at least a second one of the light entry surfaces.

16 Claims, 4 Drawing Sheets

(56) References Cited

U.S. PATENT DOCUMENTS

| | | | | |
|---|---|---|---|---|
| 10,690,307 | B2* | 6/2020 | Gromfeld | F21S 41/24 |
| 10,753,564 | B2* | 8/2020 | Sakamoto | F21S 41/143 |
| 10,816,156 | B2* | 10/2020 | Liao | F21S 41/153 |
| 10,845,017 | B2* | 11/2020 | Renaud | F21S 41/24 |
| 11,028,987 | B2* | 6/2021 | Zhang | F21S 41/24 |
| 11,092,304 | B2* | 8/2021 | Simchak | F21S 41/24 |
| 11,168,848 | B2* | 11/2021 | Mertens | F21S 41/151 |
| 11,708,954 | B2* | 7/2023 | Sato | F21S 41/24 |
| | | | | 362/509 |
| 2020/0032973 | A1 | 1/2020 | Renaud et al. | |
| 2020/0072428 | A1 | 3/2020 | Simchak et al. | |
| 2022/0349542 | A1* | 11/2022 | Zhu | F21S 41/151 |

FOREIGN PATENT DOCUMENTS

| | | |
|---|---|---|
| FR | 3087875 A1 | 5/2020 |
| WO | 2014032071 A1 | 3/2014 |
| WO | 2017198516 A1 | 11/2017 |
| WO | 2020104043 A1 | 5/2020 |

\* cited by examiner

VEHICLE HEADLAMP HAVING HIGH/LOW BEAM LIGHT GUIDES WITH DIFFERENT WIDTH ENTRY SURFACES

CROSS REFERENCE

This application claims priority to and is a continuation of PCT Application No. PCT/EP2020/065272, filed Jun. 3, 2020, the entirety of which is hereby incorporated by reference.

FIELD OF THE INVENTION

The present invention concerns a headlamp for a motor vehicle.

BACKGROUND OF THE INVENTION

A headlamp of the aforementioned type is known from WO 2017/198516 A1. The headlamp described therein comprises a plurality of first light-emitting diodes (LED) for a high beam and a plurality of second light-emitting diodes for a low beam. The light-emitting diodes can be individually controlled to adapt the generated light distribution to the traffic situation, for example to avoid dazzling an oncoming vehicle. The headlamp also comprises a first light guide for the light emitted by the first light-emitting diodes and a second light guide for the light emitted by the second light-emitting diodes. A light guide element is assigned to each of the light sources, which extends from the light source to the light guide and is comprised by the respective light guide.

A disadvantage of such a headlamp is the small spread of the light distribution produced by the headlamp, in particular the small spread of the low beam light distribution produced by the headlamp, which is in particular approximately ±30°. In order to increase the spread in the concept described in WO 2017/198516 A1, additional light guide elements would have to be provided, which would lead to higher costs of the headlamp.

BRIEF SUMMARY OF THE INVENTION

The problem underlying the present invention is the creation of a headlamp of the type mentioned above in which an increase in the spread of the light distribution produced by the headlamp, in particular the low beam, is possible at low cost.

In an example embodiment, at least a first one of the light entry surfaces has a greater width in the direction in which the light entry surfaces are arranged side by side than at least a second one of the light entry surfaces. By such a design, an increase in the spread of the light distribution produced by the headlamp can be achieved. For example, low beam light distributions with a spread of up to more than ±40° can be obtained with an appropriately designed headlamp. Furthermore, the wider light entry surfaces make the light distribution less sensitive to tolerances in relation to the positioning of the light sources.

It may be provided that at least a first one of the light entry surfaces in the direction in which the light entry surfaces are arranged side by side has such a large width that two of the light sources can be arranged side by side in front of this light entry surface. In this way the light of two light sources can be coupled into these light entry surfaces.

It is possible that the at least one first of the light entry surfaces is arranged further outwardly in the direction in which the light entry surfaces are arranged side by side than the at least one second of the light entry surfaces. In particular, the width of the light entry surfaces increases at least partially from a central region outwards in the direction in which the light entry surfaces are arranged side by side. In this way, two light sources can be selectively positioned in an outer area in front of the light entry surfaces so that a higher illuminance can be achieved in the edge areas of the light distribution.

It may be provided that the at least one first of the light entry surfaces and the at least one second of the light entry surfaces are light entry surfaces of the second light guide. In this way, the low beam light distribution is specifically influenced.

It is possible that each of the light guides has light guide elements which project from the light guides, the ends of the light guide elements facing away from the light guides forming the light entry surfaces. Furthermore, it is possible that a first light guide element, the end of which forms the at least one first of the light entry surfaces, has a greater width over its longitudinal extension in the direction in which the light entry surfaces are arranged side by side than a second light guide element, the end of which forms the at least one second of the light entry surfaces. Due to the greater width over the longitudinal extension of the light guide elements, the light moving through this wide light guide element is distributed over a greater angular range.

It may be provided that the first and/or the second light sources are designed as light-emitting diodes, which are arranged in particular on a common circuit board. By arranging them on a common circuit board, it is relatively easy to influence the light distribution produced by the headlamp, in particular without changing the optical system. This can be achieved by providing differently equipped circuit boards which differ, for example, in the arrangement and/or the number of light-emitting diodes. By replacing one board with another, the light distribution produced by the headlamp can be changed. For example, the spread of the light distribution can be easily changed without changing the optics.

It is possible that the first and/or the second light sources can be controlled individually or in individual groups. In this way, the light distribution produced by the headlamp can be adapted to the traffic situation, e.g. to avoid dazzling an oncoming vehicle.

Provision may be made for the first light exit surface and/or the second light exit surface to have a structuring. By means of a structuring, the emerging light can be homogenized, which in particular avoids undesirable local intensity maxima on components arranged behind the light exit surfaces.

It may be provided that in a region which is arranged centrally in the direction in which the light entry surfaces are arranged side by side, the structuring of the first light exit surface and/or the second light exit surface is not provided. By omitting the structuring in the central region, higher light intensities can be achieved.

It is possible that the light guides each have a collimating lens which are integrated in particular in the light exit surfaces. By integrating one collimating lens each into the light guides, the efficiency of the headlamp can be increased.

It may be provided that the headlamp comprises an, in particular monolithic, optical component which comprises both the first and the second light guide, in particular with the optical component serving as a primary optics. This design makes it easier to assemble the headlamp, in particular because components can be integrated into one another.

It is possible that the optical component has a light exit surface which is formed by the light exit surfaces of the first and second light guides, in particular wherein the light exit surfaces of the first and second light guides are adjacent to and/or merge into one another. The optical component thus contributes both to the generation of the high beam and to the generation of the low beam.

It may be provided that the headlamp has a secondary optics through which the light emerging from the light exit surfaces of the first and/or the second light guide passes during operation of the headlamp. The secondary optics may have a collimating lens which is adapted to the collimating lenses of the optical component serving as the primary optics, in particular with regard to its cutting width. By adjusting the cutting width of the collimating lenses of the primary and secondary optics, the collimation is effectively divided between the primary and secondary optics, so that the desired effect can be achieved with less effort. It is also possible for the secondary optics to have a structuring which is especially arranged on the collimating lens. By structuring the secondary optics, any artifacts generated by the structuring of the primary optics can be minimized.

BRIEF DESCRIPTION OF THE DRAWINGS

Reference is now made more particularly to the drawings, which illustrate the best presently known mode of carrying out the invention and wherein similar reference characters indicate the same parts throughout the views.

DETAILED DESCRIPTION OF THE DRAWINGS

Figure 1:
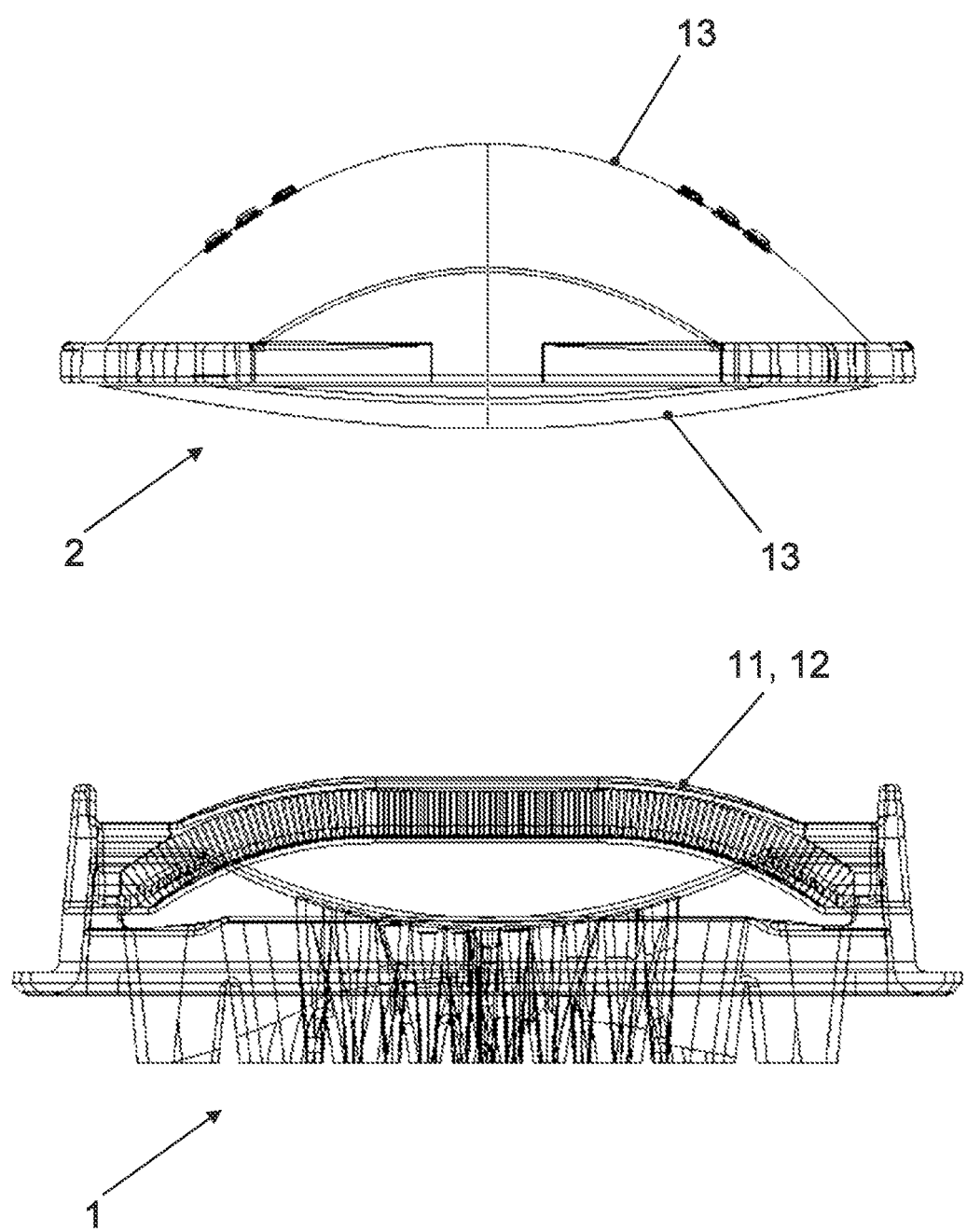
FIG. 1 is a plan view of components of a headlamp of the invention.

In the figures, identical and functionally identical parts are marked with identical reference symbols.

The illustrated version of a headlamp according to the invention comprises an unshown circuit board on which a plurality of light sources 16, 17 in the form of light-emitting diodes (LEDs) are arranged. In this case, both several first light sources 16 designed as light-emitting diodes for a high beam and several second light sources 17 designed as light-emitting diodes for a low beam are arranged on the board.

It is possible to use other light sources instead of the light-emitting diodes. For example, semiconductor lasers could also be used as light sources 16, 17.

The light sources 16, 17 can be controlled separately to switch between low beam and high beam. It is also possible to implement other functions of an adaptive front lighting system by varying the power supply to the light sources 16, 17, such as city lights, country lights or motorway lights. It is also possible to control the first and/or second light sources 16, 17 individually or in groups. In this way, the light distribution generated by the headlamp can be adapted to the traffic situation, e.g. to avoid dazzling an oncoming vehicle.

The illustrated design of a headlamp according to the invention further comprises an optical component 1 serving as a primary optics, in particular a monolithic optical component 1, and a secondary optics 2. During operation of the headlamp, the light emitted by the light sources 16, 17 passes first through the primary optics and then through the secondary optics 2.

The optical component 1, which serves as primary optics, comprises a first light guide 3 for the high beam and a second light guide 4 for the low beam (see, for example, FIG. 2 to FIG. 5). The light guides 3, 4 each have several light entry surfaces 5, 6 on their lower side in FIG. 4 and FIG. 5 (see also FIG. 2), into which the light of the light-emitting diodes is coupled when the headlamp is in operation. On the upper side shown in FIG. 4 and FIG. 5 the light guides 3, 4 each have a light exit surface 7, 8 through which the light emerges.

The light guides 3, 4 each have a plurality of light guide elements 9, 10, which protrude from the light guides 3, 4. The ends of the light guide elements 9, 10 facing away from the light guides 3, 4 form the light entry surfaces 5, 6. The light guide elements 9, 10 are essentially finger-shaped or trunk-shaped.

FIG. 1, FIG. 4, FIG. 5 and FIG. 7 illustrates that each of the light exit surfaces 7, 8 is curved so that two collimating lenses 11, 12 are formed on the optical component 1 serving as primary optics, each of which is assigned to one of the light guides 3, 4. The efficiency of the headlamp can be increased by integrating one collimating lens 11, 12 each into the light guides 3, 4.

The illustrated version of the secondary optics 2 also features a collimating lens 13, which is designed as a biconvex lens (see FIG. 1). It is also possible to design the collimating lens 13 differently, for example as a plano-convex lens. The cutting width of the collimating lens 13 of the secondary optics 2 is adapted to the cutting widths of the collimating lenses 11, 12 of the primary optics.

The illustrated design of a headlamp according to the invention further comprises an unshown housing in or on which the optical component 1 serving as primary optics with the circuit board, the secondary optics 2 and a likewise unshown heat sink for the light emitting diodes arranged on the circuit board can be mounted.

Figure 3:
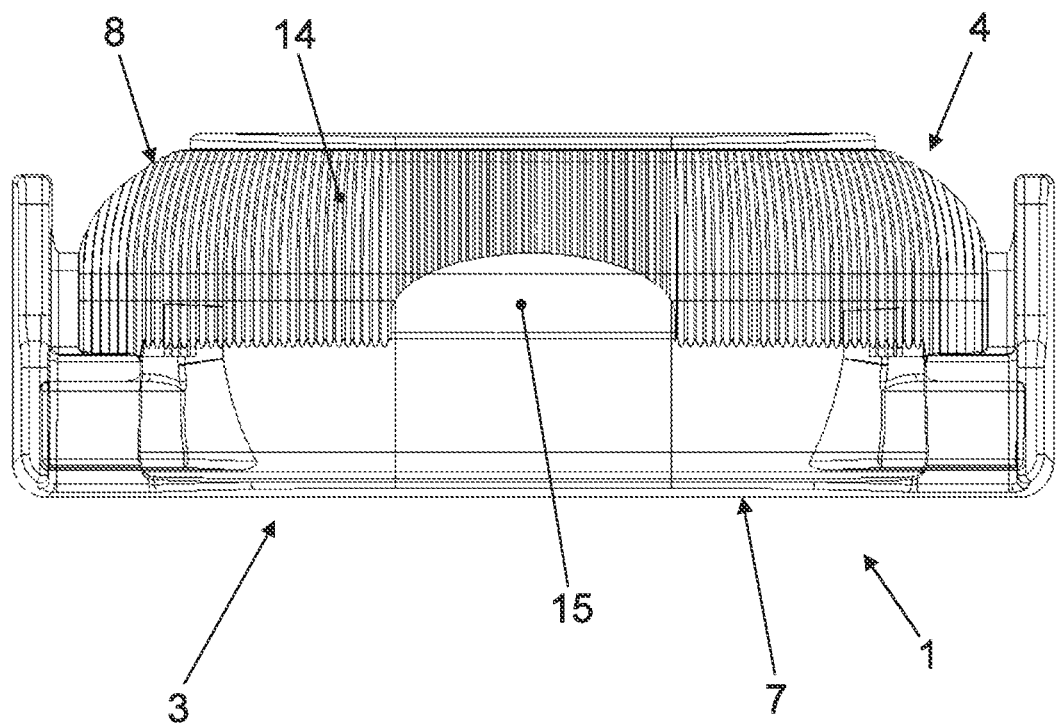
FIG. 3 is a front view of the primary optics of the headlamp as shown in FIG. 1.

FIG. 3 illustrates that the light exit surface 8 of the second light guide 4 has a structuring 14. It is certainly possible to also provide the light exit surface 7 of the first light guide 3 at least partially with this or a comparable structuring 14. The structuring 14 can be designed as a prism array, for example. The structuring 14 homogenizes the light emerging from the light exit surface 8 at least to such an extent that no undesired intensity maxima occur on the secondary optics 2 and/or an unshown cover glass.

The structuring 14 is recessed in a middle area 15. The light can pass through this recessed area 15 relatively unhindered, so that higher light intensities can be achieved.

It is certainly possible to provide a structuring on the collimating lens 13 of the secondary optics.

Figure 2:
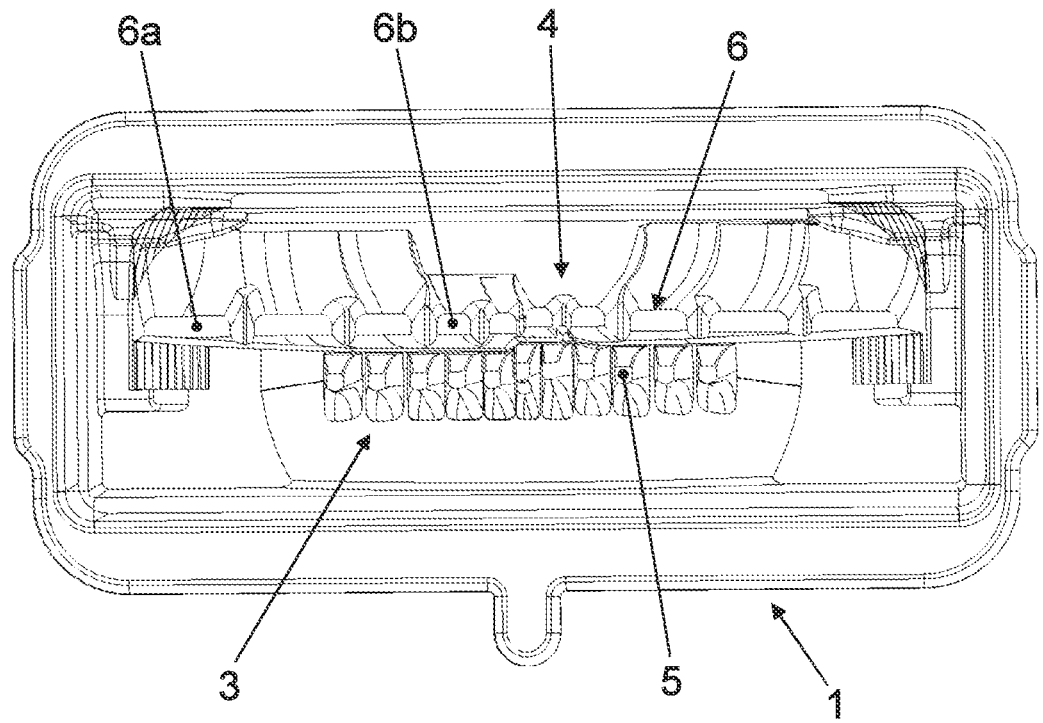
FIG. 2 is a rear view of the primary optics of the headlamp as shown in FIG. 1.
Figure 4:
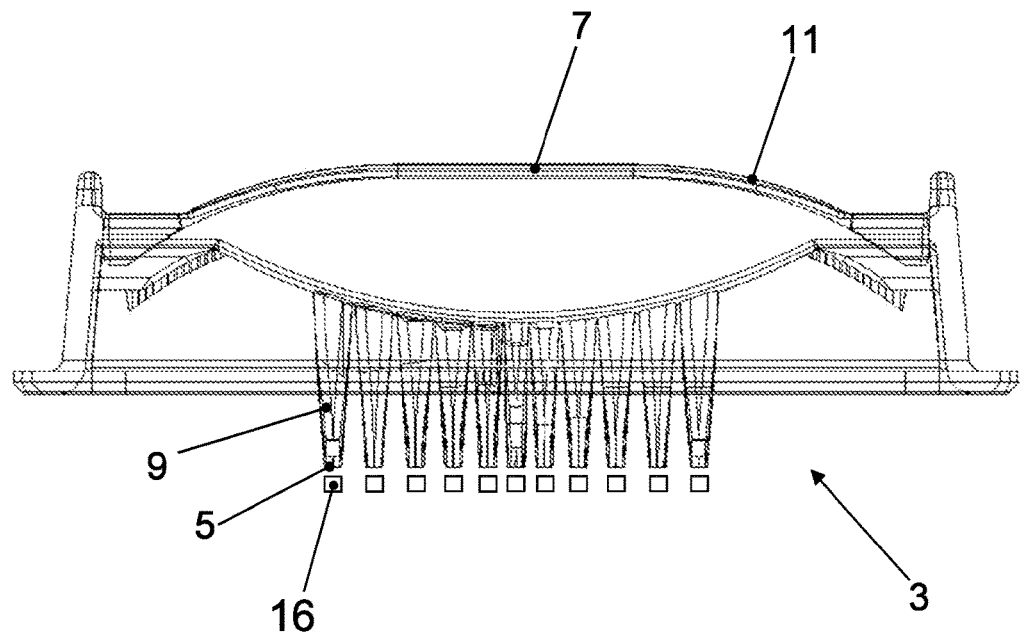
FIG. 4 is a plan view of the first light guide of the primary optics of the headlamp as shown in FIG. 1.
Figure 5:
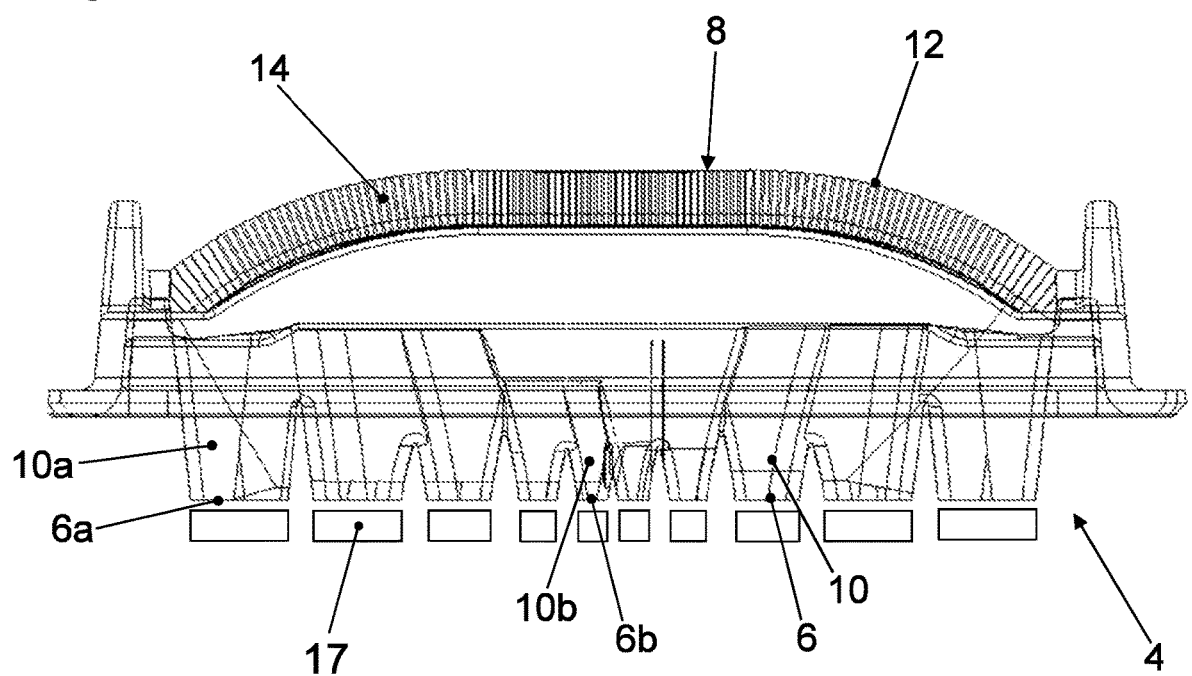
FIG. 5 is a plan view of the second light guide of the primary optic of the headlamp as shown in FIG. 1.
Figure 6:
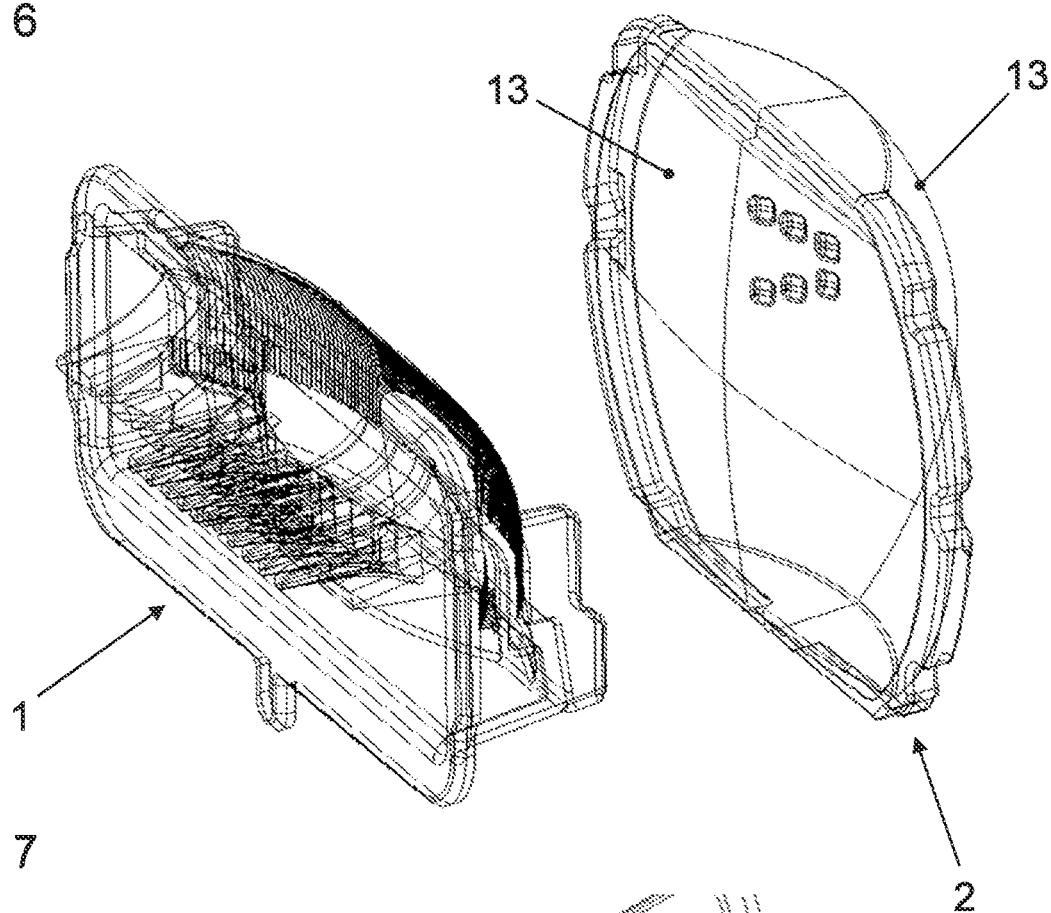
FIG. 6 is a perspective view of the components of the headlamp shown in FIG. 1.
Figure 7:
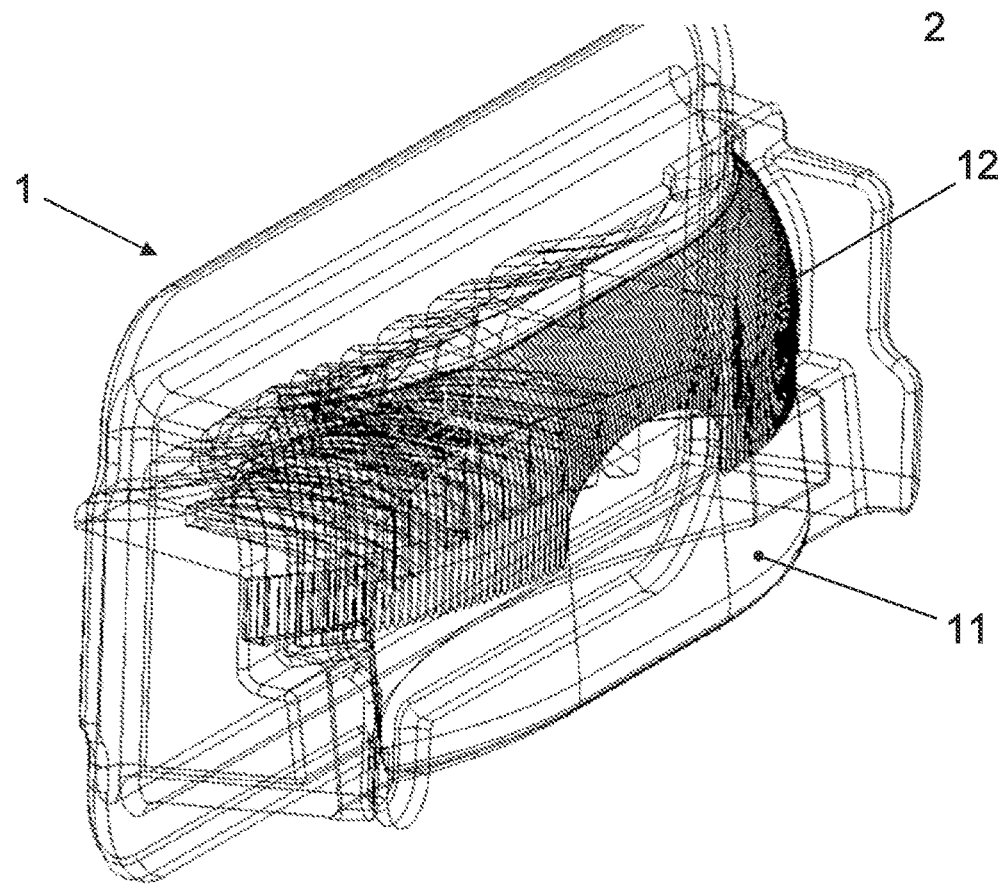
FIG. 7 is a perspective view of the primary optics of the headlamp as shown in FIG. 1.

FIG. 2, FIG. 4 and FIG. 5 illustrate that eleven light entry surfaces 5 of the first light guide 3 and ten light entry surfaces 6 of the second light guide 4 are provided, each formed by the distal end of a light guide element 9, 10. If one of the light sources 16, 17, for example in the form of a light-emitting diode, is arranged in front of each of the light entry surfaces 5, 6, eleven of the first light sources 16 for the high beam and ten of the second light sources 17 for the low beam would be provided.

However, it is quite possible to provide more or less light entry surfaces 5, 6 or more or less light guide elements 9, 10 on both the first light guide 3 and the second light guide 4.

FIG. 2 and FIG. 4 illustrate that the light entry surfaces 5 of the first light guide 3 in the direction in which the light entry surfaces 5 are arranged next to each other have the same width. In contrast, the light entry surfaces 6 of the second light guide 4 in the direction in which the light entry surfaces 6 are arranged next to each other have at least partially different widths (see FIG. 2 and FIG. 5).

The width of the light entry surfaces 6 and the width of the light guide elements 10 essentially increases at least partially from a central area to the outside. Thus a first light entry surface 6a, which is visible at the left outer edge in FIG. 5, is considerably wider than a second light entry surface 6b, which is arranged closer to the centre of the light guide 4. Accordingly, the light guide element 10a assigned to the first light entry surface 6a is also significantly wider over its longitudinal extension than the light guide element 10b assigned to the second light entry surface 6b.

Due to the greater width of the light entry surfaces 6, 6a in the outer area of the light guide 4, it is possible to arrange more than one light emitting diode in front of these light entry surfaces 6, 6a. Furthermore, the larger width makes it easier to position the light emitting diodes in front of the light entry surfaces 6.

LIST OF REFERENCE SYMBOLS

1 Optical component
2 Secondary optics
3 First light guide
4 Second light guide
5 Light entry surface of the first light guide 3
6 Light entry surface of the second light guide 4
6a First of the light entry surfaces 6
6b Second of the light entry surfaces 6
7 Light emitting surface of the first light guide 3
8 Light emitting surface of the second light guide 4
9 Light guide element of the first light guide 3
10 Light guide element of the second light guide 4
10a First of the light guide elements 10
10b Second of the light guide elements 10
11 Collimating lens of the first light guide 3
12 Collimating lens of the second light guide 3
13 Collimating lens of the secondary optics 2
14 Structuring of the light emitting surface 8
15 Recessed area of the structuring 14

I claim:

1. A headlamp for a motor vehicle, the headlamp comprising:
    a plurality of first light sources for projecting a high beam during operation of the headlamp;
    a plurality of second light sources for projecting a low beam during operation of the headlamp;
    a first light guide having a plurality of first light entry surfaces arranged side by side for receiving light emitted from the first light sources, the first light guide further including a first light exit surface; and
    a second light guide having a plurality of second light entry surfaces arranged side by side for receiving light emitted from the second light sources, the second light guide further including a second light exit surface,
    wherein at least a first one of the first or second light entry surfaces has a greater width in a direction in which the light entry surfaces are arranged side by side than at least a second one of the first or second light entry surfaces,
    wherein either the plurality of first light entry surfaces or the plurality of second light entry surfaces increase in width at least partially from a central region outwards in the direction in which the light entry surfaces are arranged side by side.

2. The headlamp according to claim 1, wherein the at least first one of the light entry surfaces has a width in the direction in which the light entry surfaces are arranged side by side, the width being about double a corresponding width of the at least second one of the light entry surfaces.

3. The headlamp according to claim 1, wherein the at least first one of the light entry surfaces is arranged further outwardly in the direction in which the light entry surfaces are arranged side by side than the at least second one of the light entry surfaces.

4. The headlamp according to claim 1, wherein the at least first one of the light entry surfaces and the at least second one of the light entry surfaces are of the plurality of second light entry surfaces of the second light guide.

5. The headlamp according to claim 1, wherein at least one of the first light sources or the second light sources is a light-emitting diode.

6. The headlamp according to claim 1, wherein the first light sources or the second light sources can be controlled individually or in individual groups.

7. The headlamp according to claim 1, wherein the first light guide and the second light guide each have a collimating lens.

8. The headlamp according to claim 1, wherein the headlamp has a secondary optics through which the light emerging from at least one of the first light exit surface or the second light exit surface passes during operation of the headlamp.

9. The headlamp according to claim 1, wherein each of the first light guide and the second light guide has light guide elements which project from the first light guide or the second light guide, the ends of the light guide elements facing away from the first light guide or the second light guide forming the light entry surfaces.

10. The headlamp according to claim 9, wherein a first light guide element, the end of which forms the at least first one of the light entry surfaces, has a greater width over its longitudinal extension in the direction in which the light entry surfaces are arranged side by side than a second light guide element, the end of which forms the at least second one of the light entry surfaces.

11. The headlamp according to claim 1, wherein at least one of the first light exit surface or the second light exit surface has a structuring.

12. The headlamp according to claim 11, wherein in a region which is arranged centrally in the direction in which the light entry surfaces are arranged side by side, the structuring of the at least one of the first light exit surface or the second light exit surface is not provided.

13. The headlamp according to claim 1, further including an optical component which comprises both the first and the second light guide.

14. The headlamp according to claim 13, wherein the optical component has a light exit surface which is formed by the first light exit surface and the second light exit surface.

15. A headlamp for a motor vehicle, the headlamp comprising:
- a plurality of first light sources for projecting a high beam during operation of the headlamp;
- a plurality of second light sources for projecting a low beam during operation of the headlamp;
- a first light guide having a plurality of first light entry surfaces arranged side by side for receiving light emitted from the first light sources, the first light guide further including a first light exit surface; and
- a second light guide having a plurality of second light entry surfaces arranged side by side for receiving light emitted from the second light sources, the second light guide further including a second light exit surface,
- wherein at least one of the first light exit surface or the second light exit surface has a structuring, and wherein in a region which is arranged centrally in a direction in which the light entry surfaces are arranged side by side, the structuring of the at least one of the first light exit surface or the second light exit surface is not provided,
- wherein at least a first one of the first or second light entry surfaces has a greater width in the direction in which the light entry surfaces are arranged side by side than at least a second one of the first or second light entry surfaces.

16. A headlamp for a motor vehicle, the headlamp comprising:
- a plurality of first light sources for projecting a high beam during operation of the headlamp;
- a plurality of second light sources for projecting a low beam during operation of the headlamp;
- a first light guide having a plurality of first light entry surfaces arranged side by side for receiving light emitted from the first light sources, the first light guide further including a first light exit surface; and
- a second light guide having a plurality of second light entry surfaces arranged side by side for receiving light emitted from the second light sources, the second light guide further including a second light exit surface,
- wherein the first light guide and the second light guide each have a collimating lens,
- wherein at least a first one of the first or second light entry surfaces has a greater width in a direction in which the light entry surfaces are arranged side by side than at least a second one of the first or second light entry surfaces.

\* \* \* \* \*